United States Patent
Guo et al.

(10) Patent No.: US 10,439,201 B2
(45) Date of Patent: Oct. 8, 2019

(54) SULFUR-CARBON COMPOSITE COMPRISING MICRO-POROUS CARBON NANOSHEETS FOR LITHIUM-SULFUR BATTERIES AND PROCESS FOR PREPARING THE SAME

(71) Applicants: Robert Bosch GmbH, Stuttgart (DE); Institute of Chemistry, Chinese Academy of Sciences, Haidian, Beijing (CN)

(72) Inventors: Yuguo Guo, Beijing (CN); Shuaifeng Zhang, Beijing (CN); Yaxia Yin, Beijing (CN); Yunhua Chen, Shanghai (CN); NaHong Zhao, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 15/579,642

(22) PCT Filed: Jun. 5, 2015

(86) PCT No.: PCT/CN2015/080924
§ 371 (c)(1),
(2) Date: Dec. 5, 2017

(87) PCT Pub. No.: WO2016/192111
PCT Pub. Date: Dec. 8, 2016

(65) Prior Publication Data
US 2018/0159121 A1  Jun. 7, 2018

(51) Int. Cl.

| | |
|---|---|
| *H01M 4/136* | (2010.01) |
| *H01M 4/38* | (2006.01) |
| *H01M 4/1397* | (2010.01) |
| *H01M 4/66* | (2006.01) |
| *H01M 4/80* | (2006.01) |
| *H01M 4/62* | (2006.01) |
| *C01B 17/00* | (2006.01) |
| *C01B 32/15* | (2017.01) |
| *H01M 10/052* | (2010.01) |
| *H01M 4/13* | (2010.01) |
| *H01M 4/02* | (2006.01) |

(52) U.S. Cl.
CPC .............. *H01M 4/136* (2013.01); *C01B 17/00* (2013.01); *C01B 32/15* (2017.08); *H01M 4/1397* (2013.01); *H01M 4/38* (2013.01); *H01M 4/625* (2013.01); *H01M 4/663* (2013.01); *H01M 4/80* (2013.01); *H01M 4/13* (2013.01); *H01M 10/052* (2013.01); *H01M 2004/021* (2013.01)

(58) Field of Classification Search
None
See application file for complete search history.

(56) References Cited

U.S. PATENT DOCUMENTS

| | | |
|---|---|---|
| 2011/0052998 A1 | 3/2011 | Liang et al. |
| 2015/0017526 A1 | 1/2015 | Zhou et al. |
| 2015/0017569 A1 | 1/2015 | Wang et al. |

FOREIGN PATENT DOCUMENTS

| | | |
|---|---|---|
| CN | 103958402 A | 7/2014 |
| CN | 103959517 A | 7/2014 |
| CN | 104272506 A | 1/2015 |
| CN | 104600265 A | 5/2015 |
| WO | 2014/085992 A1 | 6/2014 |

OTHER PUBLICATIONS

International Search Report corresponding to PCT Application No. PCT/CN2015/080924, dated Feb. 24, 2016 (5 pages).
Sevilla et al., A general and facile synthesis strategy towards highly porous carbons: carbonization of organic salts, Journal of Materials Chemistry A, Oct. 14, 2013, vol. 1, No. 44, pp. 13738-13741.
Yang et al., Sulfur-Infiltrated Graphene-Based Layered Porous Carbon Cathodes for High-Performance Lithium-Sulfur Batteries, ACS NANO, vol. 8, No. 5, Apr. 21, 2014, pp. 5208-5215.

*Primary Examiner* — Sarah A. Slifka
(74) *Attorney, Agent, or Firm* — Maginot, Moore & Beck LLP

(57) ABSTRACT

A sulfur-carbon composite includes micro-porous carbon nanosheets and sulfur. The sulfur is loaded into the micropores of the micro-porous carbon nanosheets. The sulfur-carbon composite can be included in an electrode material. The sulfur-carbon composite can be included in a lithium-sulfur battery. A process for preparing the sulfur-carbon composite includes carbonization-activation of carbonaceous precursor, purification, and loading of sulfur into micro-porous carbon nanosheets.

14 Claims, 6 Drawing Sheets

SULFUR-CARBON COMPOSITE COMPRISING MICRO-POROUS CARBON NANOSHEETS FOR LITHIUM-SULFUR BATTERIES AND PROCESS FOR PREPARING THE SAME

This application is a 35 U.S.C. § 371 National Stage Application of PCT/CN2015/080924, filed on Jun. 5, 2015, the disclosure of which is incorporated herein by reference in its entirety.

TECHNICAL FIELD

The present invention relates to a sulfur-carbon composite comprising micro-porous carbon nanosheets and sulfur, wherein sulfur is loaded into the micropores of the micro-porous carbon nanosheets, an electrode material and a lithium-sulfur battery comprising said sulfur-carbon composite as well as a process for preparing said sulfur-carbon composite.

BACKGROUND ART

In Li-sulfur batteries, the diffusion of polysulfide ions, the poor electrical conductivity of elemental sulfur and insoluble $Li_2S$ or $Li_2S_2$ cause significant capacity fading, low coulombic efficiency and insufficient cycle life. One strategy to solve the above issues is to confine elemental sulfur in a porous and conductive carbon matrix, which can not only function as conductive pathway, but also provide efficient physical confinement or chemical bonding to trap the soluble polysulfides. Sulfur loading in the micropores, where the character of the sulfur is chain-like, results in inhibiting the dissolution of polysulfide ions and good cycling performance. Various carbon hosts were designed, such as carbon molecular sieve, carbon nanotube, micropo-rous graphene. However, there are still needs for carbon hosts which are easy to be manufactured.

Main challenges for sulfur-carbon composite electrode, are how to increase the content of sulfur loading in the carbon matrix to achieve higher capacity, and to tune the size and shape of pores as well as the pore-size distribution and specific surface area for more efficient polysulfide confinement. Moreover, the low electronic conductivity of carbon matrix is a hinder for fast lithium ion diffusion, high sulfur utilization for achieving high columbic efficiency and good rate capability. Besides, preparation process for most micro-porous carbon substrates was time-consuming and difficult for reproducibility.

SUMMARY OF INVENTION

It is therefore an object of the present invention to provide a novel sulfur-carbon composite with a specific micro-porous structure and a corresponding preparation process, which makes it possible to solve the above problems.

The present invention provides a sulfur-carbon composite comprising micro-porous carbon nanosheets and sulfur, wherein sulfur is loaded into the micropores of the micro-porous carbon nanosheets.

According to the present invention, the length/thickness of the carbon nanosheets is in the range of from 500 nm/200 nm to 50 μm/10 nm, preferably in the range of from 1 μm/120 nm to 10 μm/20 nm, more preferably in the range of from 11 μm/120 nm to 5 μm/50 nm. The inventive carbon nanosheets, with the thickness of less than 200 nm, can greatly shorten the lithium ion diffusion path, enhancing the utilization of sulfur in the lithiation/delithiation process.

The present invention provides an electrode material, which comprises the sulfur-carbon composite of the present invention.

The present invention further provides a lithium-sulfur battery, which comprises the sulfur-carbon composite of the present invention.

According to the present invention, a process for preparing the above sulfur-carbon composite is provided, which comprises the steps of carbonization-activation of carbonaceous precursor in an inert-gas flow at a temperature from 500-850° C., preferably 700-850° C., more preferably 750-850° C., most preferably at a temperature of 800° C. for a period from 30 min to 10 h, preferably from 1 h to 5 h, wherein the carbonaceous precursor is optionally mixed with dopants contains N, or P, or B. or any combination of N, P and B; purification of the product obtained in the above step, followed by washing with acid solution and drying; loading of sulfur into the micro-porous carbon nanosheets obtained in the previous step.

According to the present invention, the microporous structure in the carbon nanosheets can confine sulfur molecules with chain structures, enhance the utilization of sulfur, and also helps to limit the dissolution of polysulfide into electrolytes, and thus improve the cyclic stability of sulfur. In the sulfur-carbon composite according to the present invention, sulfur with chain structures is finely dispersed in the conductive micro-porous substrate, and in particular, loaded in the micro-porous channel formed by micropores of the conductive micro-porous substrate, which ensures a strong confinement effect of sulfur, a high electrochemical activity and utilization of sulfur.

In the present invention, the micro-porous carbon nanosheets can be easily prepared via a facile one-step process, which means other post-treatment after carbonization, like activation by acid etching is unnecessary. With the activated carbonaceous precursor, numbers of micropores are generated during the carbonization process. By adjusting the carbonization temperature, the distribution of pore size can be tuned ranging from micro to mesopores. With the increased micropore volume in the carbon nanosheets, the content of loaded sulfur increases from 40% (the maximum sulfur content in micro-porous carbon nanosheets) to no less than 50%, resulting in higher energy density.

DETAILED DESCRIPTION OF PREFERRED EMBODIMENTS

The present invention relates to a sulfur-carbon composite, comprising micro-porous carbon nanosheets and sulfur, wherein sulfur is loaded into the micropores of the micro-porous carbon nanosheets.

In an embodiment of the sulfur-carbon composite according to the present invention, the micro-porous carbon nanosheets have a ratio of length/thickness in the range of from 500 nm/200 nm to 50 μm/10 nm, preferably from 1 μm/120 nm to 10 μm/20 nm, more preferably from 1 μm/120 nm to 5 μm/50 nm.

Figure 1:
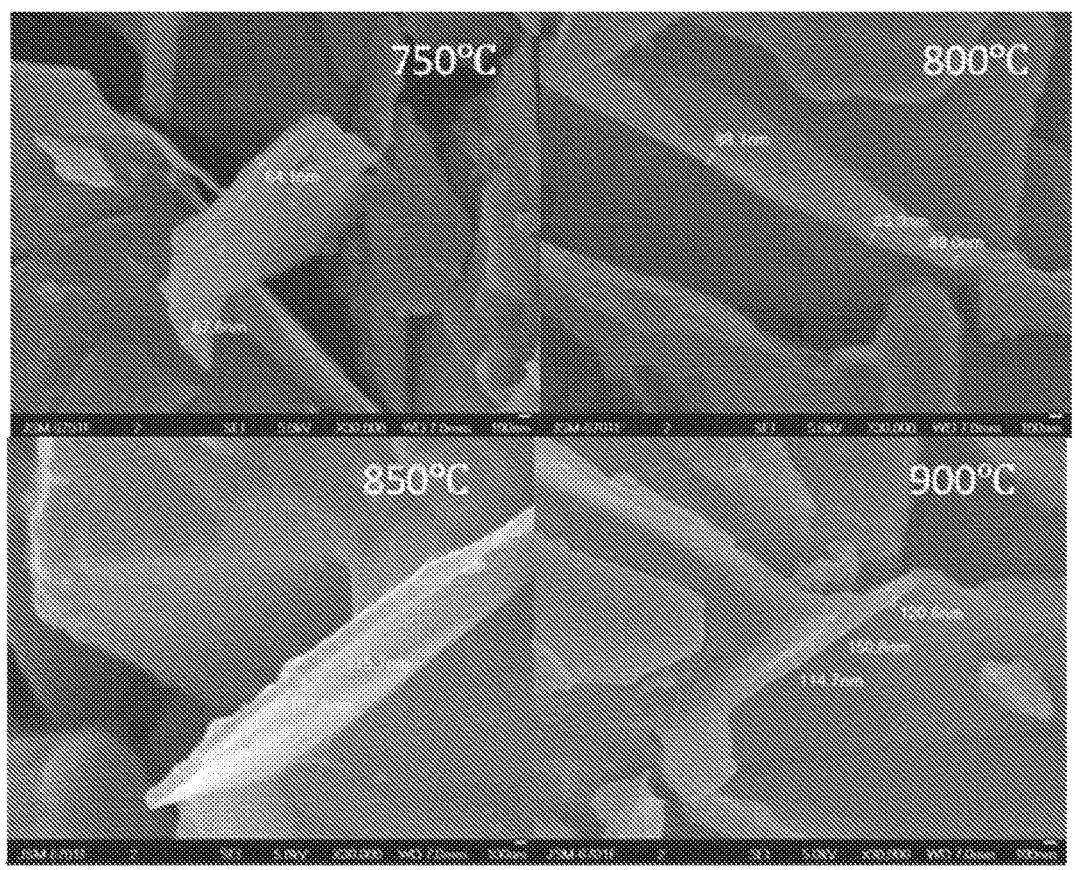
FIG. 1 is a Scanning Electron Microscopy (SEM) images of the micro-porous carbon nanosheets prepared under different carbonization temperature according to the inventive process.
Figure 2:
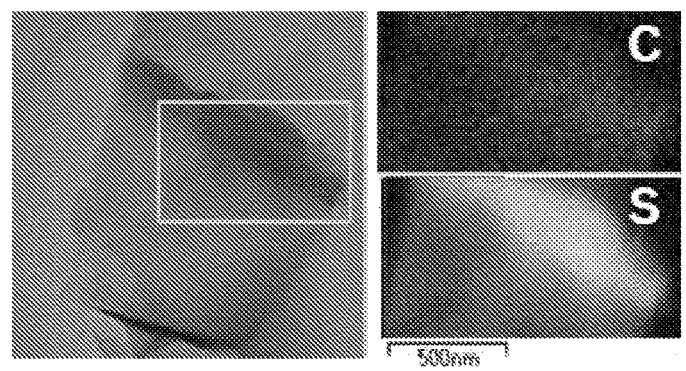
FIG. 2 is a Transmission Electron Microscopy (TEM) image of the sulfur-carbon composite prepared under 800° C. of carbonization temperature according to the inventive process.

From FIG. 1, the thickness of the obtained carbon nanosheet is increasing as the carbonization temperature is increasing. FIG. 2 shows that a sulfur/carbon nanosheet composite is prepared under 800° C. of carbonization temperature in the inventive process, from which we can see that the pore size of the carbon nanosheet is around 1 μm, and sulfur is homogeneously dispersed in the carbon matrix as shown in C and S elemental EDX mapping.

In another embodiment of the sulfur-carbon composite according to the present invention, the micro-porous carbon nanosheets have an average micropore diameter of 0.2-1.0 nm, preferably 0.6-0.9 nm.

Figure 3:
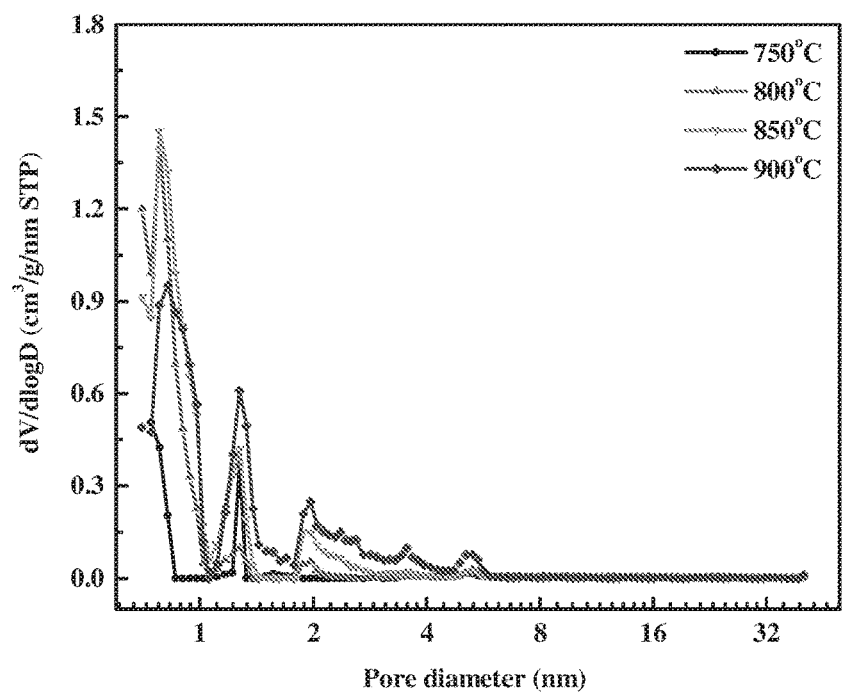
FIG. 3 is a plot showing the effect of different synthesis temperature on the pore size distribution of the obtained micro-porous carbon nanosheets.

In a further embodiment of the sulfur-carbon composite according to the present invention, the pore volumes of micropores in the micro-porous carbon nanosheets are no less than 75%, preferably no less than 80%, more preferably no less than 85% based on the total pore volumes of micropores and of mesopores. From FIG. 3, as the carbonization temperature increases, pore volumes regarding micropores (especially those having pore size smaller than 1 nm) decreases, while pore volumes regarding mesopores (pore size bigger than 1 nm) increases. The sulfur-carbon composite according to the present invention has large percentage of micropores, which is favorable for the lithium ion diffusion path and electron transmission.

Figure 4:
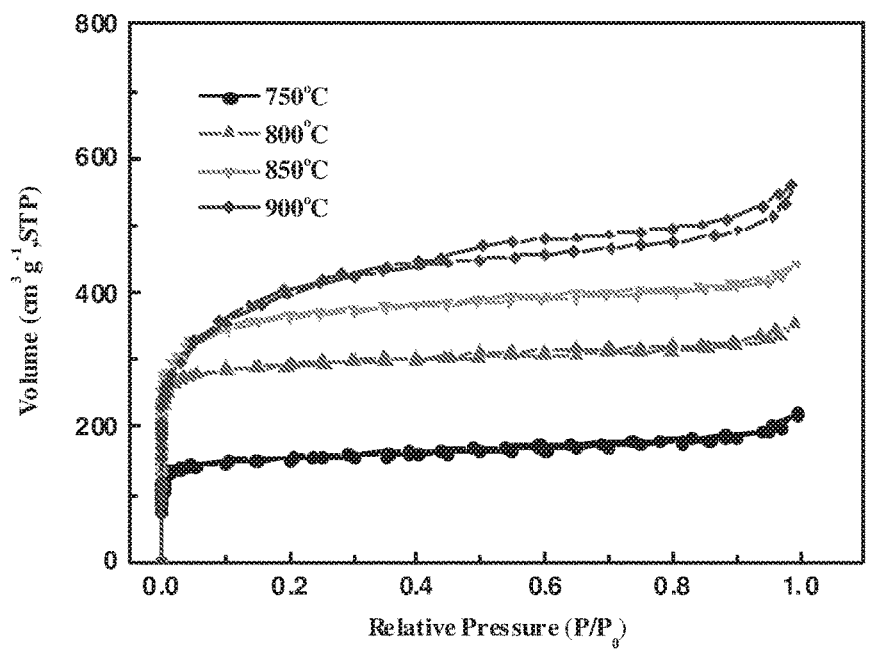
FIG. 4 is a plot showing the effect of different synthesis temperature on the specific surface area BET of the obtained micro-porous carbon nanosheets.

In a still further embodiment of the sulfur-carbon composite according to the present invention, the micro-porous carbon nanosheets have a BET specific surface area in the range of from 300 to 4500 $m^2/g$, preferably from 400 to 2000 $m^2/g$, more preferably from 550 to 1300 $m^2/g$. FIG. 4 clearly shows that the BET specific surface area of the carbon nanosheets increases as the carbonization temperature increases.

In a further embodiment of the sulfur-carbon composite according to the present invention, the micro-porous carbon nanosheets have a pore volume of 0.1-3.0 $cm^3/g$, preferably 0.5-2.0 $cm^3/g$, more preferably 0.5-1.5 $cm^3/g$.

In a further embodiment of the sulfur-carbon composite according to the present invention, the micro-porous carbon nanosheets have a sulfur load amount of 10-85 wt %, preferably 25-80 wt %, more preferably 30-75 wt %, much more preferably 33-60 wt %, in each case based on the total weight of the sulfur-carbon composite.

In a further embodiment of the sulfur-carbon composite according to the present invention, the micro-porous carbon nanosheets can be optionally doped with N, or P, or B, or any combination of N, P and B.

The present invention further relates to a process for preparing the above sulfur-carbon composite and the process specifically comprises the steps of:

(1) carbonization-activation of carbonaceous precursor in an inert-gas flow at a temperature from 500-850° C., preferably 700-850° C. more preferably 750-850° C. for a period from 30 min to 10 h. preferably from 1 h to 5 h, wherein the carbonaceous precursor is optionally mixed with dopants containing N, or P. or B, or any combination of N, P and B;

(2) purification of the product obtained in step (1), followed by washing with acid solution, and drying;

(3) loading of sulfur into the micro-porous carbon nanosheets obtained in step (2).

In the above process according to the present invention, the carbonaceous precursor is one or more selected from the group consisting of organic salts of alkali metal and organic salts of alkaline earth metal, and is preferably carboxylic salts of Na, K, and Ca, more preferably citrates, gluconates, alginates, acetate, N-(phosphonomethyl) glycinate and phthalimide salts of Na. K or Ca. and especially preferably potassium citrate. In the above step (1), the carbonaceous precursor can be optionally mixed with dopants containing N, or P, or B, or any combination of N, P and B, for preparing N, P, or B doped-carbon nanosheets. Said dopants are preferably one or more selected from the group consisting of polypyrrole, polyacrylonitrile, urea, and organoboron compounds. In addition, the total content of dopants in the carbon nanosheets is in a range of 0.3 to 8.0 wt %, preferably 0.5 to 3.0 wt % based on the total weight of the micro-porous carbon nanosheets.

In an embodiment of the present invention, the loading of sulfur comprises mixing homogenously sulfur with the micro-porous carbon nanosheets, followed by heating the mixture to form the inventive sulfur-carbon composite.

Preferably, the loading of sulfur comprises dissolving sulfur completely in an organic solvent, such as $CCl_4$, followed by adding the obtained micro-porous carbon nanosheets into the above prepared sulfur solution, after mixing homogeneously and evaporating the solvent completely, heating the mixture. During the heating process, sulfur can infiltrate into porous carbon nanosheets by capillary force so as to obtain the sulfur-carbon composite. Preferably, the heating is carried out at a temperature no higher than 200° C., more preferably around 155° C. in a sealed container.

The present invention further relates to an electrode material, which comprises the sulfur-carbon composite according to the present invention.

The present invention further relates to a lithium-sulfur battery, which comprises the sulfur-carbon composite according to the present invention.

The conductive microporous substrate according to the present invention has both favorable electric conductivity and relatively smaller pore diameter, thus is very promising in use as the substrate material for sulfur to form the sulfur-carbon composite for Li—S battery. On the one hand, higher electric conductivity can help to reduce the polarization, hence improving the sulfur utilization ratio and then the cycling capacity. On the other hand, smaller pore diameter can help to disperse sulfur into nanoscale and limit the dissolution of polysulfide into the electrolyte, hence bettering the cycling stability of Li—S battery. Moreover, the preparation process is simple to implement, and all raw materials are low in price, all these merits make the composite very promising for Li—S batteries.

Potential applications of the composite according to the present invention include high-energy-density lithium ion batteries with acceptable high power density for energy storage applications, such as power tools, photovoltaic cells and electric vehicles.

EXAMPLES

The following non-limiting examples illustrate various features and characteristics of the present invention, which is not to be construed as limited thereto:

Example 1a

The Preparation of Sulfur-Carbon Composite 1a According to the Present Invention 10 g of potassium citrate was carbonized at 750° C. in an Ar flow for one hour. The obtained black product was then washed by dilute HCl solution until reaching neutral. After that, the solid was collected by filtration, washed with abundant distilled water and dried at 100° C. for 12 hours in an oven. 0.5 g carbon nanosheets were obtained whose length is in the range of 1-3 μm. The information about the thickness of the obtained carbon nanosheets was summarized in the following Table 1.

100 mg sulfur was first dissolved completely in $CCl_4$ solvent and then the above obtained carbon nanosheets were added into the above solution of sulfur. After the solvent volatizes completely, the mixture was then put into a sealed-Teflon and heated at 155° C. for 20 h.

Scanning Electron Microscopy (SEM) (JEOS 6701F, operating at 10 kV), Transmission Electron Microscopy (TEM) (Tecnai F20). XRD (Philips PW3710X, Rigaku D/max-2500, λ=1.5405 Å) and Raman (Digilab FTS3500 (Bio-Rad), λ=514.5 nm) were employed to characterize sizes, structures, and elemental compositions of the products.

To calculate the pore size distribution and pore volumes, the nitrogen absorption and desorption isotherms were measured at 77.3 K with an Autosorb-1 specific surface area analyzer. Thermogravimetric (TG) analysis of S/C composite was performed on TG/DTA 6300 in a $N_2$ flow to obtain the S content in the composite.

For preparing working electrodes, a mixture of the above obtained active material, carbon black, and poly-(vinyl difluoride) (PVDF) at a weight ratio of 70:20:10 was pasted on an Aluminum foil. Lithium foil was used as the counter electrode. A glass fiber sheet (GF/D, Whatman) was used as a separator. An electrolyte (LB-301, Zhangjiagang Guotai-Huarong New Chemical Materials Co., Ltd.) consisting of a solution of 1 M $LiPF_6$ salt in ethylene carbonate (EC)/dimethyl carbonate (DMC) (1:1 w/w) was used. Galvanostatic cycling of the assembled cells was carried out using a battery testing system (Land electrochemical testing system) in the voltage range of 1-3 V (vs $Li^+/Li$). All measured specific capacities are based on the mass of pure sulfur in the electrodes.

Figure 5A:
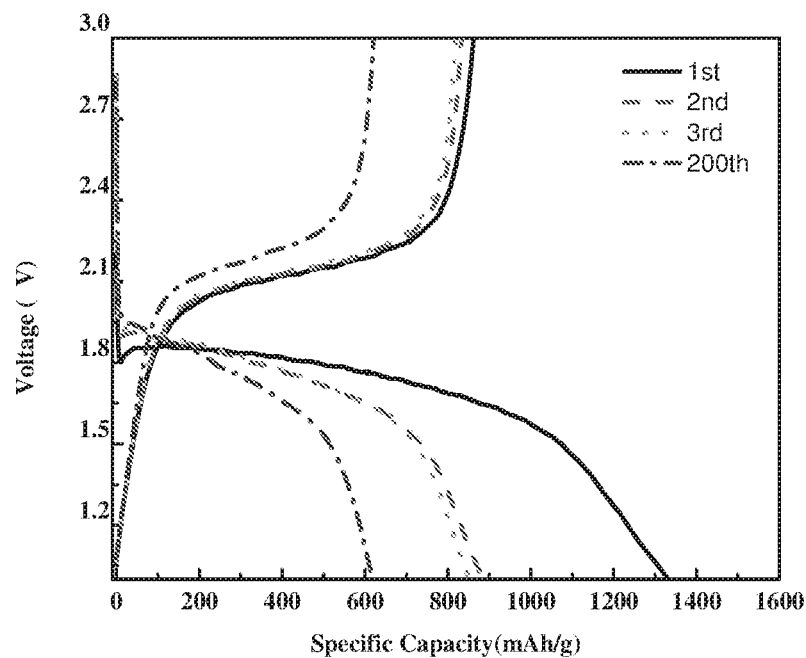
FIG. 5a is a plot showing the discharge-charge curves of the sulfur-carbon composite (S/CNSs-750 abbreviated for Sulfur-Carbon Nanosheets prepared under 750° C. of carbonization) according to the present invention (S %=45 wt %) at a discharge-charge rate of 0.1 C.
Figure 5B:
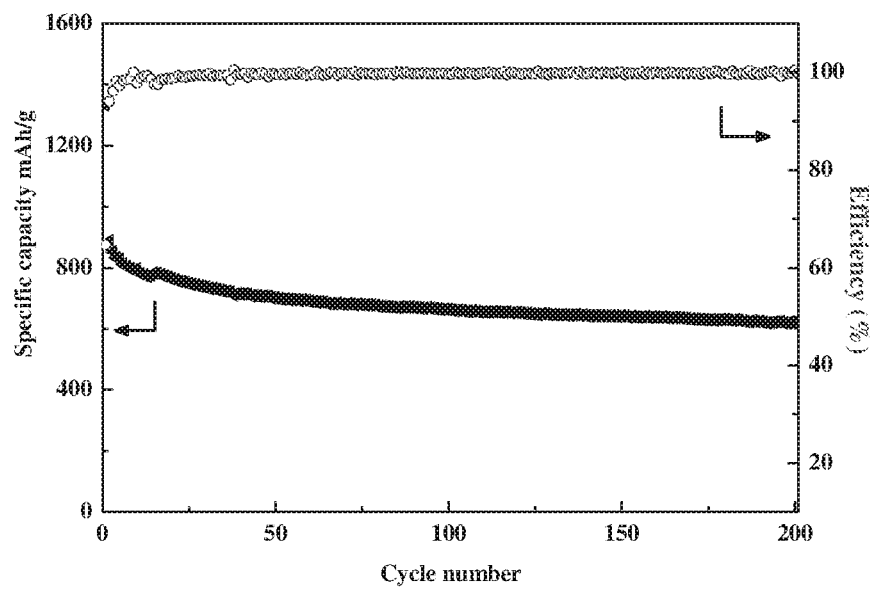
FIG. 5b is a plot showing the cycling performance of the sulfur-carbon composite (S/CNSs-750) according to the present invention (S %=45 wt %) at a discharge-charge rate of 0.1 C.

As shown in FIG. 5a, when discharged at 0.1 C, the prepared sulfur-carbon composite exhibited a single plateau at ca. 1.85V, and delivered an initial discharge capacity of 1320 mAh/g and a reversible capacity of 890 mAh/g calculated based on the mass of sulfur. As shown in FIG. 5b, the capacity retains about 69.7% after 200 cycles and the initial coulumbic efficiency is about 64.7%.

Example 1b

The Preparation of Sulfur-Carbon Composite 1b According to the Present Invention The same procedures in Example 1a were repeated in Example 1b except that the temperature for carbonization in Example 1b was changed from 750° C. to 800° C. Carbon nanosheets with length in the range of 1-5 μm were obtained.

Figure 6A:
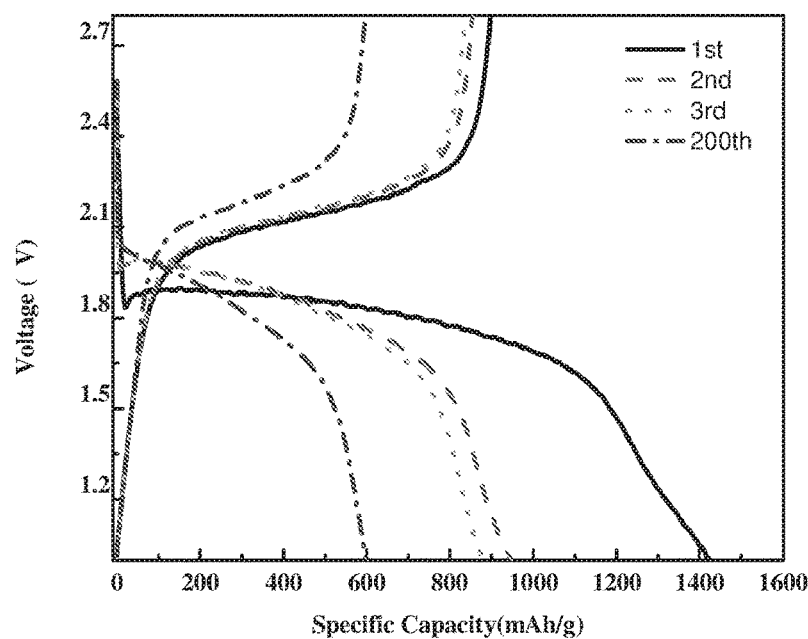
FIG. 6a is a plot showing the discharge-charge curves of the sulfur-carbon composite (S/CNSs-800 abbreviated for Sulfur-Carbon Nanosheets prepared under 800° C. of carbonization) according to the present invention (S %=50 wt %) at a discharge-charge rate of 0.1 C.
Figure 6B:
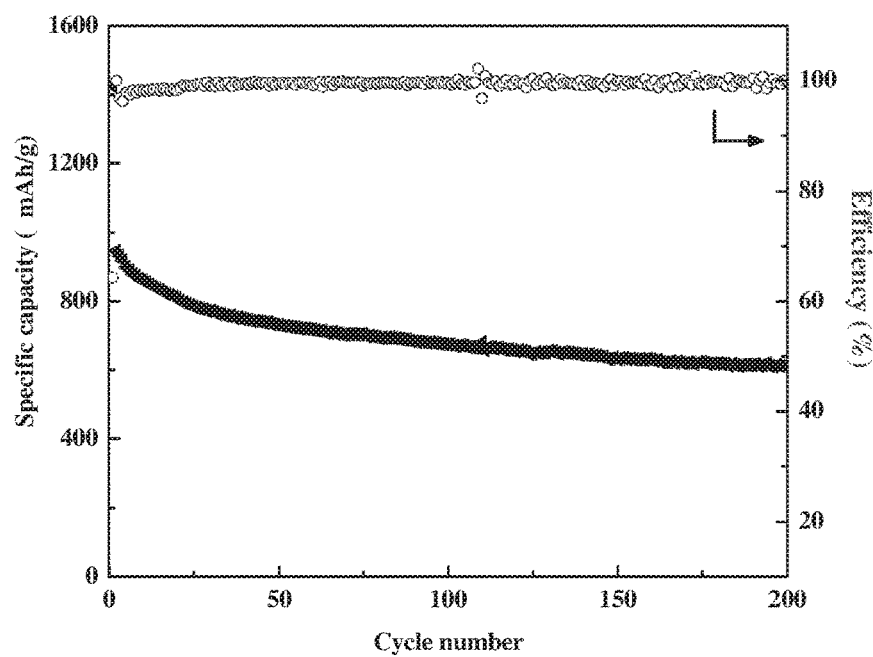
FIG. 6b is a plot showing the cycling performance of the sulfur-carbon composite (S/CNSs-800) according to the present invention (S %=50 wt %) at a discharge-charge rate of 0.1 C.

From FIG. 6a, when discharged at 0.1 C, the prepared sulfur-carbon composite exhibited a single plateau at ca. 1.85V. and delivered an initial discharge capacity of 1420 mAh/g and a reversible capacity of 940 mAh/g calculated based on the mass of sulfur. As shown in FIG. 6b, the capacity retains about 64.5% after 200 cycles and the initial coulumbic efficiency is about 63.1%.

Example 1c

The Preparation of Sulfur-Carbon Composite 1c According to the Present Invention The same procedures in Example 1a were repeated in Example 1c except that the temperature for carbonization in Example 1c was changed from 750° C. to 850° C. Carbon nanosheets with length in the range of 2-5 μm were obtained.

Figure 7A:
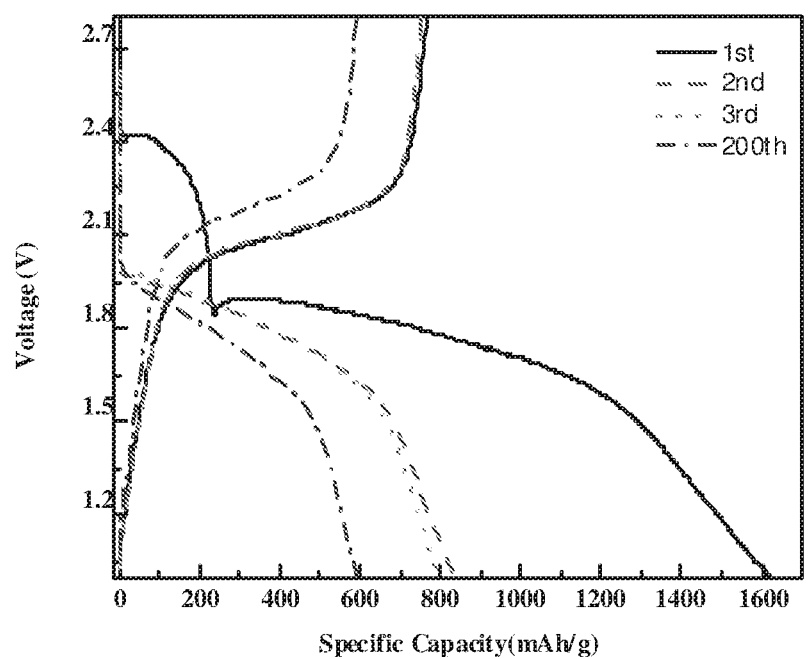
FIG. 7a is a plot showing the discharge-charge curves of the sulfur-carbon composite (S/CNSs-850 abbreviated for Sulfur-Carbon Nanosheets prepared under 850° C. of carbonization) according to the present invention (S %=50 wt %) at a discharge-charge rate of 0.1 C.
Figure 7B:
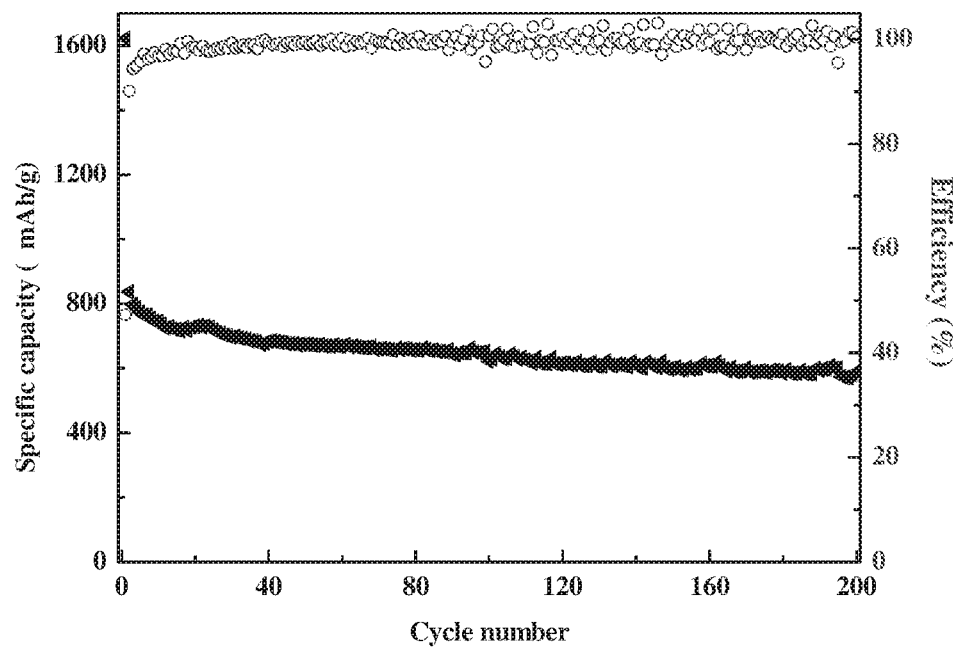
FIG. 7b is a plot showing the cycling performance of the sulfur-carbon composite (S/CNSs-850) according to the present invention (S %=50 wt %) at a discharge-charge rate of 0.1 C.

From FIG. 7a, when discharged at 0.1 C, the prepared sulfur-carbon composite exhibited a plateau at 1.8V following a short plateau at 2.4V, and delivered an initial discharge capacity of 1600 mAh/g and a reversible capacity of 836 mAh/g calculated based on the mass of sulfur. As shown in FIG. 7b, the capacity retains about 70.4% after 200 cycles and the initial coulumbic efficiency is about 47.3%.

Comparative Example 1d

The Preparation of Sulfur-Carbon Composite 1d not According to the Present Invention The same procedures in Example 1a were repeated in Comparative Example 1d except that the temperature for carbonization in Comparative Example 1d was changed from 750° C. to 900° C. Carbon nanosheets with length in the range of 2-5 μm were obtained.

Figure 8:
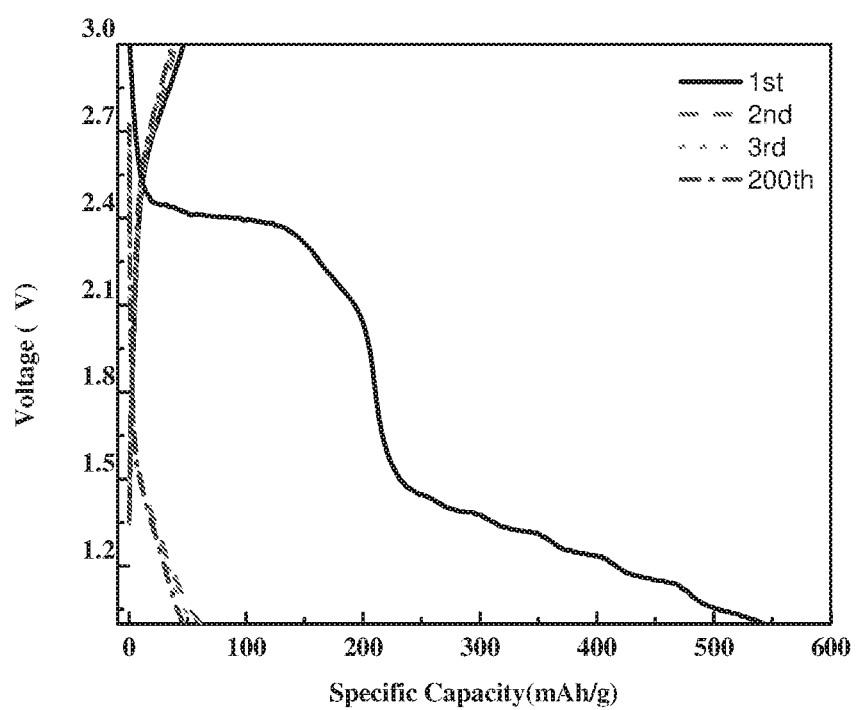
FIG. 8 is a plot showing the discharge-charge curves of the sulfur-carbon composite (S/CNSs-900 abbreviated for Sulfur-Carbon Nanosheets prepared under 900° C. of carbonization) not according to the present invention (S %=49 wt %) at a discharge-charge rate of 0.1 C.

From FIG. 8, when discharged at 0.1 C, the prepared sulfur-carbon composite exhibited two plateau at 2.4V followed by ca. 1.2V, and delivered an initial discharge capacity of ca. 550 mAh/g, and it decayed fast to 50 mAh/g calculated based on the mass of sulfur. The initial coulumbic efficiency is about 9.1%.

From the characterization results of Example 1a to 1d, table 1 is summarized hereinafter for the detailed data of sulfur-carbon composite prepared in the above Examples and Comparative Example:

TABLE 1

| Example No. | Temperature of carbonization (° C.) | BET specific surface area ($m^2/g$) | Pore volume Vp ($cm^3/g$) | | Average micro pore diameter (nm) | Percentage of micropores (%) | Average thickness of the carbon nanosheet (nm) | Reversible Capacity (mAh/g) | Initial coulumbic efficiency (%) | Capacity retention after 200 cycles |
|---|---|---|---|---|---|---|---|---|---|---|
| | | | Pore volume of $V_{micro}$ ($cm^3/g$) | Pore volume of $V_{meso}$ ($cm^3/g$) | | | | | | |
| 1a | 750 | 732.6 | 0.3 0.24 | 0.06 | 0.7 | 80% | 60-70 | 890 | 64.7 | 69.7 |
| 1b | 800 | 1259 | 0.505 0.44 | 0.065 | 0.78 | 87.1% | 80-90 | 940 | 63.1 | 64.5 |
| 1c | 850 | 1358 | 0.631 0.502 | 0.13 | 0.85 | 79.6% | 100-120 | 836 | 47.3 | 70.4 |
| 1d | 900 | 1314 | 0.81 0.41 | 0.4 | 1.1 | 50.6% | 120-150 | 550 | 9.1 | N/A |

Based on the above results in Table 1, although the sulfur-carbon composite according to the present invention has a pore volume less than that of sulfur-carbon composite not according to the present invention, the pore volume of micropores of the inventive sulfur-carbon composite is similar or equivalent to that of sulfur-carbon composite not according to the present invention, namely, the percentage of micropores of the inventive sulfur-carbon composite is much higher than that of sulfur-carbon composite not according to the present invention.

Due to the increased pore volume of micropores, the sulfur-carbon composite of the present invention could favorably increase the content of sulfur loading in the carbon nanosheets so as to achieve higher capacity.

From FIG. 8, the carbonization temperature of 900° C. would cause a sharp decrease in the coulombic efficiency and sulfur utilization during discharge/charge process and the carbon nanosheets obtained under carbonization temperature of 900° C. is not suitable for the purpose of the present invention.

The invention claimed is:

1. A sulfur-carbon composite, comprising:
   micro-porous carbon nanosheets; and
   sulfur, wherein the sulfur is loaded into micropores of the micro-porous carbon nanosheets.

2. The sulfur-carbon composite according to claim 1, wherein a ratio of a length of the micro-porous carbon nanosheets to a thickness of the micro-porous carbon nanosheets is in a range of 500 nm:200 nm to 50 μm:10 μm.

3. The sulfur-carbon composite according to claim 1, wherein the micro-porous carbon nanosheets have an average micropore diameter of 0.2-1.0 nm.

4. The sulfur-carbon composite according to claim 1, wherein pore volumes of the micropores of the micro-porous carbon nanosheets are no less than 75% of total pore volumes of the micropores and of mesopores.

5. The sulfur-carbon composite according to claim 1, wherein the micro-porous carbon nanosheets have a BET specific surface area in a range of 300 to 4500 $m^2/g$.

6. The sulfur-carbon composite according to claim 1, wherein the micro-porous carbon nanosheets have a pore volume of 0.1-3.0 $cm^3/g$.

7. The sulfur-carbon composite according to claim 1, wherein the micro-porous carbon nanosheets have a sulfur load amount of 10-85 wt % based on total weight of the sulfur-carbon composite.

8. The sulfur-carbon composite according to claim 1, wherein the micro-porous carbon nanosheets are optionally doped with one of N, P, B, or any combination of N, P, and B.

9. The sulfur-carbon composite of claim 1, wherein the sulfur-carbon composite is included in a lithium-sulfur battery.

10. An electrode material, comprising:
    a sulfur-carbon composite, including:
       micro-porous carbon nanosheets; and
       sulfur,
    wherein the sulfur is loaded into micropores of the micro-porous carbon nanosheets.

11. A process for preparing a sulfur-carbon composite, the process comprising:
    (1) carbonization-activation of carbonaceous precursor in an inert-gas flow at a temperature of 500-850° C. for a period of 30 minutes to 10 hours, wherein the carbonaceous precursor is optionally mixed with dopants containing one of N, P, B, or any combination of N, P, and B;
    (2) purification of the product obtained by the carbonization-activation of carbonaceous precursor, followed by washing with acid solution, and drying to obtain micro-porous carbon nanosheets;
    (3) loading of sulfur into the obtained micro-porous carbon nanosheets.

12. The process according to claim 11, wherein the carbonaceous precursor is one or more selected from the group consisting of organic salts of alkali metal and organic salts of alkaline earth metal.

13. The process according to claim 11, wherein loading of sulfur into the micro-porous carbon nanosheets includes mixing homogeneously sulfur with the micro-porous carbon nanosheets obtained in step (2), followed by heating the mixture so as to obtain the sulfur-carbon composite.

14. The process according to claim 13, wherein loading of sulfur into the micro-porous carbon nanosheets includes dissolving sulfur completely in an organic solvent, followed by adding the micro-porous carbon nanosheets obtained in step (2) into the above prepared sulfur solution; after mixing homogeneously and evaporating the solvent completely, heating the mixture so as to obtain the sulfur-carbon composite.

* * * * *